United States Patent Office 2,883,414
Patented Apr. 21, 1959

2,883,414

PROCESS FOR THE MANUFACTURE OF EXPLOSIVE NITRIC ESTERS

Paul E. Wilt III and Aubrey A. Young, Tamaqua, Pa., assignors to Atlas Powder Company, Wilmington, Del., a corporation of Delaware No Drawing. Application January 18, 1956
Serial No. 559,767

9 Claims. (Cl. 260—467)

The present application relates to the nitration of ethylene glycol and mixtures of ethylene glycol and other polyhydric materials to produce explosive liquid nitric esters.

In performing the present invention the nitration is accomplished in the presence of an additive which prevents inverse separations.

Explosive liquid nitric esters have been used for many years as a principal sensitive ingredient of industrial explosives. The original explosive liquid nitric ester was simple nitroglycerin (glycerol trinitrate) and it has become customary in the art to refer to any explosive liquid nitric ester used in explosives as "nitroglycerin," even though it is now usual to include nitrated polyhydroxylic compounds other than glycerol trinitrate in liquid nitric ester compositions.

Usually mixtures of liquid nitric esters are prepared by nitrating mixtures of the base polyhydroxylic compounds. For example, for many years "nitroglycerin" for use in commercial dynamite has been prepared by nitrating a mixture of glycerin and ethylene glycol. In the course of time the content of nitrated ethylene glycol in "nitroglycerin" has tended to increase. Other polyhydroxylic compounds which are sometimes included in material to be nitrated for the manufacture of explosive liquid nitric esters are sorbitol, glucose, sucrose and ethylene glycol glucoside. At times "nitroglycerin" mixtures are used which contain no true nitroglycerin but only nitric esters of polyhydroxylic compounds other than glycerin.

In the preparation of explosive liquid nitric esters it is customary to run the polyhydric material to be nitrated slowly into mixed acid made up of mixed nitric and fuming sulfuric acids under conditions of refrigeration and agitation. As the reaction proceeds an emulsion of nitrated products in mixed acid is formed. Customarily after the reaction has been completed, the nitrated mixture is run into a vessel where the emulsion breaks, the "nitroglycerin" separating out at the top with the spent mixed acid on the bottom.

During the nitration the nitrated product exists as an oil dispersed throughout the nitrating acid so that the contents of the nitrator are in the form of an oil-in-acid emulsion. As the nitration progresses, the ratio of oil or dispersed phase to acid or continuous phase increases, so that in the latter part of the process, the globules of oil are quite tightly packed together.

It has been found that sometimes when ethylene glycol or mixtures of polyhydric materials containing high proportions of ethylene glycol are being nitrated, normal breaking of the emulsion and separation of the liquid ester from the acid often does not occur. The oil-in-acid emulsion may break toward the end of the nitration, and invert to a loosely held acid-in-oil emulsion. This change is manifested by the charge losing the smooth character of the true emulsion, and changing to a nonuniform mixture which may be described as thin or watery by comparison. This inverted charge separates much more rapidly than a normal charge, and can often be observed to be separating before it is entirely transferred to the separator. The separation takes place by the acid falling out of the oil layer, resulting in a line of separation which rises from the bottom. In a normal separation the globules of oil coalesce and rise to the top, resulting in a line of separation which moves from the top downward. In an inverse separation the final line is less sharp, usually consisting actually of two lines close together, with incompletely separated material between them. The final line also is lower than normal, indicating less complete separation.

There are serious disadvantages to inverse separations. The separation is incomplete, for a large amount of spent acid is held in the nitroglycerin layer. This acid is lost to the process and requires neutralization by a large amount of alkali. Also an inverse separation is a definite abnormality, and any abnormality in the highly standardized processes of explosives manufacture causes great concern from an operating standpoint.

It has been discovered in accordance with the present invention that inverse separations may be prevented by the inclusion of small amounts of suitable additives in the nitration mix.

The additives which may be used are polyoxyethylene ethers of polyhydric alcohols. The polyoxyethylene ethers of polyhydric alcohols may be combined with additional substituents such as ether groups and ester groups. It is usually preferred to use additives which are soluble in the material to be nitrated and best results are usually obtained when they are dissolved in the polyhydric material prior to its addition to the mixed acid. However, the additives may be added to the mixed acid directly and it is usually preferred that additives which are not soluble in the material to be nitrated be added in this manner.

Often it is found desirable to limit the average polyoxyethylene chain length of additives of the invention to values of 100 or less. Otherwise the materials may be difficult to handle in the process. On the other hand, it is usually desirable to employ average polyoxyethylene chain lengths of at least about 10 to get the best results except when the additive is a polyoxyethylene ester. In the latter case lengths as low as four have been found quite satisfactory.

An example of suitable polyoxyethylene ethers of polyhydric alcohols are polyoxyethylene ethers of sorbitol, polyoxyethylene ethers of mannitol and polyoxyethylene glycols. Suitable esters of these compounds which may be mentioned include polyoxyethylene esters of stearic and other fatty acids.

Usually inverse separations are not found to occur when the content of ethylene glycol in the material to be nitrated is lower than about 70% by weight. With ethylene glycol content of 70% by weight and higher, however, inverse separations can occur and consequently, the use of an additive of the present invention is desirable in such cases.

The amount of additive which is necessary to prevent inverse separations will vary considerably with the particular mixture being nitrated and the particular additive being used. In general, however, it is not necessary to use more than one tenth percent of additive, but usually amounts in excess of 0.00025%, based upon the weight of material being nitrated, are desirable.

Reproduced below are the results of a number of examples which illustrate specific embodiments of the invention. In each case, except as noted in the footnotes, 100 grams of a mixture made up of 80% ethylene glycol and 20% glycerin was slowly fed into an agitated cooled vessel containing 443 grams of mixed acids made up of 52.17% nitric acid, 49.85% sulfuric acid and 0.17% nitrosyl sulphuric acid. Following addition of the mixture of ethylene glycol and glycerin to the mixed acid, the reacted mixture was permitted to stand and observations were made as to whether the separation was normal or inverse and in case of a normal separation the time for appearance of a definite line between acid and nitrated product was observed. The details of each experiment are shown in the following table and as appear there, various additives were employed. As noted in the table, when the additive was soluble in the ethylene glycol mixture it was dissolved therein prior to nitration. Otherwise the additive was added to the mixed acid.

Table

| Example | Additive | Amount of Additive (grams) | Separating Time (minutes) | Type of Separation |
|---|---|---|---|---|
| 1 | None | | | Inverse. |
| 2 | polyoxyethylene (4) stearate.[1] | 0.1 | 18 | Normal. |
| 3 | polyoxyethylene (10) stearate.[1] | 0.01 | 20 | Do. |
| 4 | polyoxyethylene (40) stearate.[1] | 0.003 | 18 | Do. |
| 5 | polyoxyethylene (20) sorbitol.[2,3] | 0.05 | 18 | Do. |
| 6 | polyoxyethylene (40) sorbitol.[2,3] | 0.001 | 13 | Do. |
| 7 | polyoxyethylene (75) sorbitol.[2,3] | 0.001 | 14 | Do. |
| 8 | polyoxyethylene (100) sorbitol.[2,3] | 0.001 | 21 | Do. |
| 9 | polyoxyethylene (23.5) mannitol.[2] | 0.1 | 17 | Do. |
| 10 | Carbowax 1000 [2,4] | 0.005 | 17 | Do. |
| 11 | polyoxyethylene (8) oleate [1] | 0.01 | 23 | Do. |
| 12 | polyoxyethylene (15) laurate.[1] | 0.01 | 15 | Do. |
| 13 [5] | None | | | Inverse. |
| 14 [1,5] | polyoxyethylene (40) stearate. | 0.01 | 17 | Normal. |

[1] Added with mixed acid.
[2] Added with material nitrated.
[3] A mixture of polyoxyethylene sorbitol and polyoxyethylene glycol prepared by adding the number of mols of ethylene oxide indicated in parentheses to 180 parts by weight of a mixture of 85% sorbitol and 15% water.
[4] A trade mark for a brand of polyoxyethylene glycol having a molecular weight of about 1000.
[5] Material nitrated was 100% ethylene glycol.

What is claimed is:

1. A process for the preparation of explosive liquid nitric esters which comprises nitrating, with mixed nitric and sulfuric acids, a mixture of glycerin and ethylene glycol, which mixture includes at least about 70% by weight of ethylene glycol, in the presence of a polyoxyethylene ether of a saturated aliphatic polyhydric alcohol.

2. A process for the preparation of explosive liquid nitric esters which comprises nitrating, with mixed nitric and sulfuric acids, a mixture of glycerin and ethylene glycol, which mixture includes at least about 70% by weight of ethylene glycol, in the presence of a polyoxyethylene ester of a higher fatty acid, said ester having at least 4 oxyethylene groups.

3. A process for the preparation of an explosive liquid nitric ester which comprises nitrating, with mixed nitric and sulfuric acids, a mixture of glycerin and ethylene glycol, which mixture includes at least about 70% by weight of ethylene glycol, in the presence of a polyoxyethylene ether of a saturated aliphatic polyhydric alcohol, said ether having between about 10 and 100 oxyethylene groups.

4. A process for the preparation of an explosive liquid nitric ester which comprises nitrating, with mixed nitric and sulfuric acids, a mixture of glycerin and at least about 70% by weight of ethylene glycol, in the presence of a polyoxyethylene ether produced by reacting a mixture of water and sorbitol with ethylene oxide.

5. A process in accordance with claim 1 wherein said polyoxyethylene ether of a polyhydric alcohol is employed in an amount in excess of 0.00025% and not more than 0.1% based upon the weight of material being nitrated.

6. A process in accordance with claim 1 in which said polyoxyethylene ether of a polyhydric alcohol contains a higher fatty acid group as a substituent.

7. A process according to claim 1 in which the polyoxyethylene ether comprises polyoxyethylene ether of sorbitol.

8. A process in accordance with claim 2 wherein the fatty ester is employed in amount in excess of 0.00025% and not more than 0.1% by weight of the material being nitrated.

9. A process according to claim 2 in which the polyoxyethylene ester is a polyoxyethylene ester of stearic acid, which ester contains about 40 oxyethylene groups.

References Cited in the file of this patent

UNITED STATES PATENTS

| 1,206,223 | Hough | Nov. 28, 1916 |
| 2,648,698 | Preckel | Aug. 11, 1953 |
| 2,754,271 | Kirkpatrick | July 10, 1956 |